United States Patent [19]

Kraus

[11] Patent Number: 4,891,248

[45] Date of Patent: Jan. 2, 1990

[54] CATALYST-CONTAINING COATING TO PROMOTE RAPID CURING OF POLYURETHANE LACQUERS

[75] Inventor: Wayne A. Kraus, Newark, Del.

[73] Assignee: Hercules Incorporated, Wilmington, Del.

[21] Appl. No.: 310,185

[22] Filed: Feb. 13, 1989

Related U.S. Application Data

[62] Division of Ser. No. 172,615, Mar. 24, 1988.

[51] Int. Cl.[4] .......................... B05D 1/36; B05D 7/00; B05D 3/04; B05D 3/10
[52] U.S. Cl. ..................................... 427/340; 106/190; 106/311; 427/385.5; 427/407.1; 427/415; 524/37
[58] Field of Search ..................... 106/18.35, 190, 195, 106/311; 427/385.5, 393, 340, 407.1, 408, 415, 407.2, 409, 412.1; 428/425.1; 524/37

[56] References Cited

U.S. PATENT DOCUMENTS 4,254,168 3/1981 Monson ........................ 427/407.1 X
4,631,206 12/1986 Mabuchi et al. .................... 427/340

Primary Examiner—Michael Lusignan
Attorney, Agent, or Firm—Joanne W. Patterson

[57] ABSTRACT

Disclosed is a process for promoting the rapid curing of a two component polyurethane lacquer that has been applied to a substrate. A cure coat composition consisting of a hydroxy functional polymer such as nitrocellulose, a solvent for the polymer, and a urethane catalyst such as an organic tin compound, is applied over the polyurethane lacquer while it is in a wet or semi-dry state.

4 Claims, No Drawings

CATALYST-CONTAINING COATING TO PROMOTE RAPID CURING OF POLYURETHANE LACQUERS

This application is a division, of application Ser. No. 07/172,615, filed 3/24/88.

FIELD OF THE INVENTION

This invention relates to a method for promoting the rapid curing of a coating of a two component polyurethane lacquer that has been applied to a substrate. This invention particularly relates to the application of a coating of a composition containing a urethane catalyst and a hydroxy functional polymer to the polyurethane lacquer coating to promote such rapid curing.

BACKGROUND OF THE INVENTION

Nitrocellulose lacquer is commonly used to finish wood furniture due to its ease of application, repairability, clarity and tolerable early print resistance. Print resistance is the ability to resist "printing" or "blocking", the impression left in the coating when another article is stacked on top of the coated substrate. Blocking occurs when the finish does not dry fast enough. Cross-linking the coating, e.g., by reaction of the free hydroxyl groups of nitrocellulose with polymeric isocyanates to produce urethane linkages, will improve the mar, chemical and early print resistance. However, an even more rapid development of print resistance would be desirable.

One method for overcoming this blocking problem is the use of a catalyst in vapor form to accelerate the curing of paints and coatings at room temperature as described in British patent No. 2,142,843, British patent application No. 2,166,976 and Australian patent application No. 62772/86. The process involves exposing a wet coating to catalyst molecules in a turbulent atmosphere. The catalyst impinges onto and permeates the film, causing rapid polymerization to take place.

Another method for decreasing the drying and blocking time is described in U.S. Pat. No. 4,517,222. This process involves concurrently generating an atomizate of (1) a coating composition comprising a hydroxy functional compound and a polyisocyanate and (2) a carrier gas bearing a catalytic amount of a vaporous tertiary amine, mixing the atomizate and the catalyst-bearing carrier gas, and directing the mixture onto the substrate to form a film.

Both of these methods require large expenditures of capital for special equipment and the resulting coating may still lack the rapid rate of development of block resistance that is desired.

SUMMARY OF THE INVENTION

It has now been found that rapid development of block resistance in a coating of a two component polyurethane lacquer that has been applied to a substrate can be promoted without the use of specialized equipment by coating the lacquer while it is in a wet or semi-dry state with a cure coat composition consisting essentially of (1) from about 0.5% to about 20% by weight of a hydroxy functional polymer, (2) from about 99.4% to about 70% of a solvent for the hydroxy functional polymer and (3) from about 0.1% to about 10% of a catalyst for the reaction of hydroxyl groups and isocyanate groups to form urethane linkages, all percentages being by weight based on the total weight of the composition.

DETAILED DESCRIPTION OF THE INVENTION

The cure coat composition of this invention is applied over a coating of a two component polyurethane lacquer that has been applied to a substrate. The cure coat is applied while the lacquer is in a semi-dry or preferably in a wet state to ensure adequate mixing of the cure coat with the polyurethane lacquer. A two component polyurethane lacquer is one that is formed by the reaction of a polyol and a polyisocyanate.

When the polyurethane lacquer is applied to a substrate, solvent evaporates from the lacquer film, and eddy currents form as a result of differences in temperature, surface tension, and density. Evaporation of solvent at the film surface increases the viscosity and lowers the surface temperature of the film. The specific gravity and surface tension of the surface material are increased and the surface material sinks back into the film. The lower layers of coating, rich in solvent and with a low surface tension, break through the upper coating layer (which has a low solvent content), and spread over the surface, thus allowing the solvent to evaporate. This sequence of rise, spread-out, and sink is repeated continuously, and localized eddy currents are formed. It is believed that when the cure coat composition of this invention is applied over a coating of a two component polyurethane lacquer, the cure coat composition intermixes in the eddy currents. These currents would contain the polyurethane lacquer and also the cure coat composition. The large amount of catalyst in the cure coat composition promotes immediate cross-linking. If this same amount of catalyst were part of the polyurethane formulation, the polyurethane would gel before it could be applied to the substrate if using a single stream application system.

The cure coat composition of this invention can be used to promote the rapid curing of a coating of any two component polyurethane lacquer. Polyols suitable for use in the preparation of a two component polyurethane lacquer include, but are not limited to, polyester polyols, polyether polyols, polycarbonate polyols, hydroxyacrylic resins, alkyd resins and esters of ricinoleic acid and polyhydric alcohols. Polyisocyanates suitable for use in the preparation of a two component polyurethane lacquer include, but are not limited to, hexamethylene diisocyanate biurets, trimers of hexamethylene diisocyanate and isophorone diisocyanate trimers. For example, a typical two component polyurethane lacquer contains a combination of nitrocellulose and a polyester polyol as the polyol component and hexamethylene diisocyanate biuret as the polyisocyanate component.

The combination of the polyurethane lacquer coating plus the cure coat composition of this invention can be applied to any surface to which the polyurethane lacquer will adhere, e.g., metal, wood, glass and plastic substrates. Several coats of polyurethane lacquer are typically applied to the substrate before application of the cure coat to the final coat.

Hydroxy functional polymers suitable for use in the cure coat composition of this invention include cellulose derivatives such as cellulose acetate butyrate, cellulose acetate propionate, nitrocellulose, ethyl cellulose and cellulose acetate and synthetic resins such as hydroxyacrylic resins. Nitrocellulose is preferred. Any grade of nitrocellulose can be used. The hydroxy functional polymer is present in an amount of from about 0.5% to about 20% by weight, based on the total weight of the cure coat composition.

When nitrocellulose is used as the hydroxy functional polymer, the catalyst can be any organometallic catalyst for the reaction of hydroxyl groups with isocyanate groups to form polyurethane linkages. Suitable catalysts include zirconium octoate, cobalt octoate, calcium octoate, manganese octoate, bismuth octoate, nickel octoate, zinc napthenate, zinc octoate, cobalt neodeconate, dibutyltin dilaurate, dimethyltin dichloride, dibutyltin diacetate, dibutyltin di-2-ethyl hexoate and antimony 2-ethyl hexoate. Tin catalysts are preferred. Dimethyltin dichloride is most preferred. When a hydroxy functional polymer other than nitrocellulose is used, tertiary amines can also be used as the catalyst. Suitable tertiary amines include, but are not limited to, dimethylethanolamine, 1,4-diazobicyclo[2.2.2]-octanetriethylenediamine, dimethylcyclohexylamine, bis-dimethylaminoethyl ether and 1,3,5-tris-(3-dimethylaminopropyl)-hexahydro-5-triazine. The catalyst is present in an amount of from about 0.1% to about 10% by weight, based on the total weight of the cure coat composition.

A solvent for the hydroxy functional polymer is present in the cure coat composition in an amount of from about 99.4% to about 70% by weight, based on the total weight of the composition. The solvent used will depend upon the particular hydroxy functional polymer used. The solvent should have a medium evaporation rate and an odor acceptable to the industry, and should dissolve and intermix well when the cure coat composition is applied over the polyurethane lacquer. When nitrocellulose is used as the hydroxy functional polymer, any active solvent for nitrocellulose can be used. Suitable solvents include esters and ketones. Butyl acetate is preferred.

The drying and curing time for various substrates coated with the combination of a two component polyurethane lacquer and the cure coat composition of this invention will vary depending upon parameters such as the speed of the conveyor carrying the article through the production line and the thickness of the polyurethane lacquer coating. The total thickness of the polyurethane lacquer coating is preferably 2.5-3.0 mils dry. The degree of block resistance required before a coated article can be stacked for shipping will depend upon the weight of the coated article.

The cure coat composition of this invention is preferably applied to the polyurethane lacquer coating by spraying. For this method of application the viscosity of the composition is formulated to 17 sec in a #4 Ford viscometer cup. However, the cure coat composition can also be applied by various other methods such as dipping, roll coating and curtain coating. The thickness of the layer of the combination of the polyurethane lacquer and the cure coat composition is preferably from about 2.7-3.3 mils dry.

In this specification all parts are by weight unless otherwise noted.

EXAMPLE 1

A cure coat composition for promoting the rapid curing of polyurethane lacquer coatings is prepared by dissolving 11.45 parts RS grade ½ sec nitrocellulose (70%), IPA wet linter grade, supplied by Hercules Incorporated, in 88.25 parts butyl acetate and then adding 0.3 part dimethyltin dichloride as the catalyst.

EXAMPLE 2

A cure coat composition is prepared by dissolving 10.4 parts RS grade 5-6 sec nitrocellulose (isopropyl alcohol (IPA) wet) supplied by Hercules Incorporated, in a mixture of 80.1 parts butyl acetate and 7.5 parts methyl amyl ketone and then adding 2.0 parts dibutyltin dilaurate as the catalyst.

EXAMPLE 3

A cure coat composition is prepared by dissolving 5.6 parts RS grade 60-80 sec nitrocellulose (IPA wet) supplied by Hercules Incorporated, in 92.4 parts butyl acetate and adding 2.0 parts dibutyltin dilaurate as the catalyst.

EXAMPLE 4

A cure coat composition is prepared by dissolving 5.3 parts SS grade 40-60 sec nitrocellulose (IPA wet) supplied by Hercules Incorporated, in a mixture of 68.3 parts methyl amyl ketone and 24.4 parts butyl acetate, and then adding 2.0 parts dibutyltin dilaurate as the catalyst.

EXAMPLE 5

In this example the hardness as a function of time of lacquer films with and without the application of the cure coat composition of Example 2 is compared by means of the Konig hardness test.

The standard nitrocellulose (NC) lacquer used in test (1) has the following composition (PBW = parts by weight):

| PBW | |
|---|---|
| 13.65 | RS ¼ sec nitrocellulose (70%) (Hercules Incorporated) |
| 8.12 | BECKOSOL 12-035 alkyd resin (60%) (Reichhold Chemical Co.) |
| 3.82 | CELLOLYN 104 hard resin (Hercules Incorporated) |
| 4.77 | Dioctyl phthalate |
| 6.87 | Butanol |
| 27.66 | Xylene |
| 10.31 | Methyl ethyl ketone |
| 21.98 | Butyl acetate |
| 2.06 | EXXATE 600 solvent (Exxon Chemical Americas) |
| .76 | Ethanol |
| 100.00 | |

The nitrocellulose/urethane lacquer used in tests (2), (3) and (5) is CSL-202 (Hercules Incorporated) and has the composition given below. In test (5) the dibutyltin dilaurate catalyst is omitted from the cure coat composition of Example 2.

| | PBW |
|---|---|
| Part A | |
| 13.8 | UG RS ¼ sec nitrocellulose (65%) (Hercules Incorporated) |
| 7.2 | MULTRON R221-75 PMA polyester resin (Mobay Chemical Company) |
| .02 | Zinc octoate (8% zinc) |
| 8.8 | Toluene |
| 7.5 | EXXATE 600 solvent (Exxon Chemical Americas) |
| 26.3 | Methyl isobutyl ketone |
| 30.0 | Methyl ethyl ketone |
| Part B | |
| 6.4 | DESMODUR N—100 polyfunctional aliphatic isocyanate (Mobay Chemical Company) |

-continued

| | PBW |
|---|---|
| 100.00 | |

The cellulose acetate butyrate(CAB)/urethane lacquer used in test (4) has the following composition:

Part A

| PBW | |
|---|---|
| 10.5 | CAB-381-0.1 (Eastman Chemical) |
| 1.5 | Polyol 1066 modified castor oil (Spencer Kellogg Textron Incorporated) |
| 23.1 | Methyl ethyl ketone |
| 17.04 | Butyl acetate |
| 9.28 | Methyl amyl ketone |
| 22.32 | Toluene |
| 5.33 | Xylene |

Part B

| | |
|---|---|
| 9.6 | DESMODUR N—75 aliphatic polyisocyanate (Mobay Chemical Corporation) |
| 1.33 | SPENLITE P—25-60 aliphatic urethane prepolymer (Spencer Kellogg Textron Incorporated) |
| 100.00 | |

The wiping stain used in preparing the panels for the test has the following composition:

| PBW | |
|---|---|
| 17.3 | #1 Industrial grade castor oil (Spencer Kellogg Textron Incorporated) |
| 40.7 | Aromatic 150 aromatic hydrocarbon (Exxon) |
| 35.4 | Silver bond silica extender pigment (Tammsco, Inc.) |
| 2.5 | Van Dyke brown pigment (Hoover Color Corp.) |
| 3.1 | Magnesium silicate |
| 1.0 | REGAL ® 330R carbon black pigment (Cabot Corp.) |
| 100.0 | |

The Konig Hardness instrument used for the tests consists of pendulums that have two steel rocker balls that contact the dry film and rock back and forth. The number of pendulum swings (between specific angles) are counted by an electronic counter. The oscillations of a pendulum are dampened more by a softer coating than by a harder coating. The higher the number, the harder the coating.

The maple panels used for the Konig Hardness Development tests are prepared as follows:
1. Coat with a castor oil wiping stain and allow to dry for 30 minutes.
2. Seal with the same lacquer that is subsequently used in the test coating and allow to dry for 30 minutes.
3. Coat with the lacquer indicated in Table 1 and dry for 30 minutes.
4. Coat with lacquer and dry for 30 minutes.
5. Apply cure coat if used (tests (3) through (5)).

The total dry film thickness on each panel is 3 mils.

Each panel is tested after 1, 2, 4, 6, 24 and 48 hours and after 5 days. The results of the tests are given in Table 1.

TABLE 1

| Test Coating | 1 hr. | 2 hrs. | 4 hrs. | 6 hrs. | 24 hrs. | 48 hrs. | 5 days |
|---|---|---|---|---|---|---|---|
| (1) Standard NC lacquer | 27 | 29 | 42 | 50 | 68 | 74 | 83 |

TABLE 1-continued

| Test Coating | 1 hr. | 2 hrs. | 4 hrs. | 6 hrs. | 24 hrs. | 48 hrs. | 5 days |
|---|---|---|---|---|---|---|---|
| (2) NC/urethane lacquer | 7 | 7 | 9 | 11 | 22 | 41 | 100 |
| (3) NC/urethane lacquer plus cure coat | 16 | 20 | 34 | 51 | 90 | 96 | 109 |
| (4) CAB/urethane lacquer plus cure coat | 13 | 22 | 34 | 51 | 97 | 96 | 102 |
| (5) NC/urethane lacquer, plus uncatalyzed cure coat | 8 | 10 | 14 | 18 | 35 | 58 | 69 |

EXAMPLE 6

The print resistance of panels with and without the cure coat composition described in Example 2 is tested as described below. Print resistance is a standard test known in the art and is used to determine at what point in time a coated article can be wrapped and packaged into a box for shipment. A given weight is applied over a 1 inch×1 inch square of ¼ inch wood covered with a 1 inch×1 inch square of cheesecloth. The weight is adjusted to coincide with the pounds per square inch the coated article will be subjected to. The term "print free" or "no print" applies to a coating that has been dried and then subjected to a given psi without leaving an impression of "print". The four main variables involved in the test are: the time period the coating has dried before being tested, the amount of weight used, the length of time the test is allowed to run, and film thickness.

Maple panels for the print resistance study are prepared as described in Example 5. The formulations for the wiping stain, standard nitrocellulose lacquer, nitrocellulose/ urethane lacquer, and cellulose acetate butyrate/urethane lacquer are the same as those described in Example 5.

The cure coat is applied over the lacquer coating in tests (3) through (6). In test (4) the zinc octoate catalyst is omitted from the NC/urethane lacquer formulation. In test (5) the dibutyltin dilaurate catalyst is omitted from the cure coat composition of Example 2.

The print resistance test is run at 4 psi. The tests are started at 1, 2, 4 and 8 hours after the last coat is applied and evaluations are made 24 hours after the start of the test. The print rating system is as follows:
0 —severe
2 —heavy
4 —medium
6 —slight
8 —very slight
10 —none The results of the test are given in Table 2.

EXAMPLE 7

Test panels with and without the cure coat composition described in Example 2 are evaluated as described below to determine their resistance to methyl ethyl ketone (MEK), which is an indication of the amount of cross-linking that has taken place in the coating.

The maple test panels are prepared as described in Example 5. The formulations for the wiping stain, standard nitrocellulose lacquer, nitrocellulose/urethane lacquer, and cellulose acetate butyrate/urethane lacquer are the same as those described in Example 5.

The cure coat is applied over the lacquer coating in tests (3) through (7). In tests (4) and (6) the dibutyltin dilaurate catalyst is omitted from the cure coat formulation. In test (5) the zinc octoate catalyst is omitted from the NC/urethane lacquer formulation.

The tests are started at 2, 4, and 8 hours, 6 days and 14 days after the last coat is applied. Cotton balls are saturated with methyl ethyl ketone (MEK) and placed under a watchglass for 30 minutes. Evaluations of the effect that MEK has on the coating are made 24 hours after the test is stopped.

The results are shown in Table 3.

TABLE 3

| (1) Standard Nitrocellulose Lacquer | |
|---|---|
| 2 hours - | completely redissolved |
| 4 hours - | completely redissolved |
| 8 hours - | completely redissolved |
| 6 days - | completely redissolved |
| 14 days - | completely redissolved |
| (2) Nitrocellulose/Urethane Lacquer | |
| 2 hours - | completely redissolved |
| 4 hours - | completely redissolved |
| 8 hours - | completely redissolved |
| 6 days - | MEK resistant; slight watchglass ring |
| 14 days - | MEK resistant; slight watchglass ring |
| (3) Nitrocellulose/Urethane Lacquer plus Cure Coat | |
| 2 hours - | MEK resistant; slight watchglass ring |
| 4 hours - | MEK resistant; slight watchglass ring |
| 8 hours - | MEK resistant; slight watchglass ring |
| 6 days - | MEK resistant; slight watchglass ring |
| 14 days - | MEK resistant; slight watchglass ring |
| (4) Nitrocellulose/Urethane Lacquer, plus Uncatalyzed Cure Coat | |
| 2 hours - | completely redissolved |
| 4 hours - | completely redissolved |
| 8 hours - | completely redissolved |
| 6 days - | MEK resistant; slight watchglass ring |
| 14 days - | MEK resistant; slight watchglass ring |
| (5) Nitrocellulose/Urethane Lacquer without Catalyst, plus Cure Coat | |
| 2 hours - | MEK resistant; slight watchglass ring |
| 4 hours - | MEK resistant; slight watchglass ring |
| 8 hours - | MEK resistant; slight watchglass ring |
| 6 days - | MEK resistant; slight watchglass ring |
| 14 days - | MEK resistant; slight watchglass ring |
| (6) Standard Nitrocellulose Lacquer, plus Uncatalyzed Cure Coat | |
| 2 hours - | completely redissolved |
| 4 hours - | completely redissolved |
| 8 hours - | completely redissolved |
| 6 days - | completely redissolved |
| 14 days - | completely redissolved |
| (7) CAB/Urethane Lacquer plus Cure Coat | |
| 2 hours - | surface blistered, did not redissolve |
| 4 hours - | surface blistered, did not redissolve |
| 8 hours - | surface blistered, did not redissolve |
| 6 days - | surface blistered, did not redissolve |
| 14 days - | surface blistered, did not redissolve |

EXAMPLE 8

The relative cure rates of two nitrocellulose-urethane lacquers coated with a cure coat composition containing dimethyltin dichloride (DMTDC) and dibutyltin dilaurate (DBTDL) and lacquer coatings without a cure coat are compared using attenuated total reflectance infrared spectroscopy (ATR-IR) and Soxhlet extraction analysis.

The cure coat solutions are prepared by dissolving RS grade ½ sec nitrocellulose (Hercules Incorporated) in urethane grade n-butyl acetate to give 10 weight % polymer solids. The amount and type of catalyst used are indicated in Table 4. After adding the catalyst, the solutions are thoroughly mixed. The viscosity (#4 Ford cup) is adjusted to a sprayable viscosity of 17 sec by the addition of n-butyl acetate.

The CSL-202 nitrocellulose-urethane lacquer described in Example 5 is sprayed onto four TEFLON-coated glass plates in three applications to achieve a film thickness of 2.8–3.0 mils. Five minutes after the final application of the lacquer, a 0.2–0.3 mil thick layer of the cure coat formulations indicated in Table 4 is applied by spraying. The fourth plate, coated with CSL-202 but no cure coat, is used as the control. The same procedure is repeated using three plates coated with SUPER LIL-LAC nitrocellulose-urethane lacquer (Lilly Industrial Coatings) and the cure coat formulations indicated in Table 4. The coatings are allowed to dry in a constant temperature/humidity room until they are tack-free. After two hours, the coatings are compared using ATR-IR spectroscopy to determine whether there is a decrease in free isocyanate (NCO) groups at the surface, an indication of the extent to which chemical cross-linking has taken place. The results are given in Table 4.

Soxhlet extractions are conducted 24, 48 and 168 hours hours after coating to determine the extent of curing. A portion of the coating is peeled off the TEFLON-coated glass plates, placed in a pre-weighed cellulose extraction thimble and weighed. This weight is subtracted from the cup weight to obtain the coating weight before extraction. The thimble is placed in the Soxhlet extractor and the lacquer film is extracted for four hours with acetone. The thimble is removed, air dried for five minutes, dried in vacuo for one hour at 70° C., removed from the thimble and then weighed to give the weight % film remaining after Soxhlet extraction. The higher the weight % lacquer film remaining after extraction, the greater the extent of curing. The results are given in Table 4.

TABLE 4

| Sample | Time (hours) | Wt % Film After Soxhlet | Decreasing NCO By IR | Lacquer Coating | Cure Coat |
|---|---|---|---|---|---|
| 1a | 24 | 73.95 | No | SUPER LIL-LAC | 0.7% DBTDL |
| 1b | 48 | 78.61 | No | | |
| 1c | 168 (1 wk) | 90.95 | Yes | | |
| 2a | 24 | 92.38 | Yes | SUPER LIL-LAC | 0.3% DMTDC |
| 2b | 48 | 90.47 | Yes | | |
| 2c | 168 | 94.59 | Yes | | |
| 3a | 24 | 92.13 | Yes | SUPER LIL-LAC | 0.5% DMTDC |
| 3b | 48 | 90.46 | Yes | | |
| 3c | 168 | 92.22 | Yes | | |
| 4a | 24 | 74.01 | No | CSL-202 | 0.7% DBTDL |
| 4b | 48 | 78.28 | No | | |
| 4c | 168 | 91.33 | Yes | | |
| 5a | 24 | 89.86 | Yes | CSL-202 | 0.3% DMTDC |
| 5b | 48 | 89.82 | Yes | | |
| 5c | 168 | 92.60 | Yes | | |
| 6a | 24 | 90.64 | Yes | CSL-202 | 0.5% DMTDC |
| 6b | 48 | 89.14 | Yes | | |
| 6c | 168 | 92.73 | Yes | | |
| 7a | 24 | 0.00 | No | CSL-202 | None |
| 7b | 48 | 20.58 | No | | |
| 7c | 168 | 88.78 | Yes | | |

EXAMPLE 9

The hardness as a function of time of lacquer films with and without a cure coat is compared by means of the Konig hardness test described in Example 5. The cure coat formulations are made with a hydroxyacrylic resin or cellulose acetate butyrate (CAB) as the hydroxy functional polymer and dibutyltin dilaurate (DBTDL) or a tertiary amine (DES-PP) as the catalyst.

A polyurethane lacquer is prepared by mixing 150 ml IMRON ® polyurethane enamel (Du Pont) and 50 ml IMRON ® 192S activator (Du Pont).

The following cure coat formulations are prepared for application over the IMRON ® polyurethane lacquer.

| | Cure Coat 1 |
|---|---|
| 89.7 g | Butyl acetate |
| 8.3 | ACRYLOID QR-999 hydroxyacrylic polyol (Rohm and Haas Co.) |
| 2.0 | Dibutyltin dilaurate |
| 100.0 | |

| | Cure Coat 2 |
|---|---|
| 89.7 g | Butyl acetate |
| 8.3 | ACRYLOID QR-999 hydroxyacrylic polyol (Rohm and Haas Co.) |
| 2.0 | DESMORAPPID PP tertiary amine catalyst (Mobay Chemical Corp.) |
| 100.0 | |

A CAB/urethane lacquer having the composition described in Example 5 is prepared.

The following cure coat formulations are prepared for application over the CAB/urethane lacquer.

| | Cure Coat 3 |
|---|---|
| 58.6 g | Butyl acetate |
| 19.4 | Methyl amyl ketone |
| 14.3 | Methyl ethyl ketone |
| 5.7 | CAB-381-20 cellulose acetate butyrate (Eastman Chemical) |
| 2.0 | Dibutyltin dilaurate |
| 100.0 | |

| | Cure Coat 4 |
|---|---|
| 58.6 g | Butyl acetate |
| 19.4 | Methyl amyl ketone |
| 14.3 | Methyl ethyl ketone |
| 5.7 | CAB-381-20 cellulose acetate butyrate (Eastman Chemical) |
| 2.0 | DESMORAPPID PP tertiary amine catalyst (Mobay Chemical Corp.) |
| 100.0 | |

One coat of the IMRON ® polyurethane lacquer is sprayed onto three glass test panels. One panel is sprayed with cure coat formulation 1, another with cure coat formulation 2 and the third is the control with no cure coat. Three test panels are then sprayed with the CAB/urethane lacquer. One of these panels is sprayed with cure coat formulation 3, one with cure coat formulation 4 and the third is the control with no cure coat.

The Konig hardness test is carried out at four locations on each plate. The results are given in Table 5.

TABLE 5

| | KONIG HARDNESS IMRON ® LACQUER | | | KONIG HARDNESS CAB/URETHANE LACQUER | | |
|---|---|---|---|---|---|---|
| DRY TIME (HOURS) | NO CURE COAT | DBTDL CURE COAT | DES-PP CURE COAT | NO CURE COAT | DBTDL CURE COAT | DES-PP CURE COAT |
| 2.0 | 7 | 14 | 11 | 20 | 49 | 80 |
| | 6 | 14 | 11 | 20 | 50 | 80 |
| | 6 | 13 | 11 | 20 | 49 | 80 |
| | 7 | 14 | 10 | 20 | 49 | 81 |
| 3.0 | 6 | 13 | 10 | 22 | 62 | 81 |
| | 7 | 12 | 10 | 20 | 63 | 85 |
| | 7 | 12 | 11 | 21 | 61 | 79 |
| | 6 | 13 | 10 | 21 | 61 | 80 |
| 4.0 | 7 | 11 | 11 | 25 | 75 | 79 |
| | 6 | 11 | 10 | 23 | 78 | 80 |
| | 6 | 11 | 11 | 21 | 80 | 81 |
| | 7 | 11 | 11 | 21 | 78 | 82 |

EXAMPLE 10

The print resistance of panels with and without the cure coat composition of Example 1 is tested as described in Example 6.

A cure coat is applied over the lacquer coating in tests (3) through (5). In test (4) the dimethyltin dichloride catalyst is omitted from the cure coat formulation.

The formulations for the wiping stain and the CAB/urethane lacquer are the same as the ones described in Example 5.

The standard nitrocellulose lacquer used in test (1) has the following composition.

| PBW | |
|---|---|
| 11.2 | RS ½ sec nitrocellulose (Hercules Incorporated) |
| 8.0 | AROPLAZ ® 2575-X-60 nonoxidizing alkyd resin (NL Industries) |
| 3.2 | CELLOLYN 104 hard resin (Hercules Incorporated) |
| 4.0 | Dioctyl phthalate |
| 24.0 | Butyl acetate |
| 8.0 | Methyl ethyl ketone |
| 4.8 | n-Butanol |
| 4.0 | Butyl cellosolve |
| 32.8 | Xylene |
| 100.0 | |

The nitrocellulose/urethane lacquer used in tests (2) through (4) is prepared by mixing 300 parts of Part A of the CLS-202 formulation described in Example 5 with 20.4 parts DESMODUR N-100 polyfunctional aliphatic isocyanate (Mobay Chemical Co.).

The print resistance test is run at 4 psi. The tests are started at 1, 2 and 3 hours after the last coat is applied and evaluations are made 24 hours after the start of the test.

The results of the test are given in Table 6.

TABLE 6

| | Test Coating | 1 hr. | 2 hrs. | 3 hrs |
|---|---|---|---|---|
| (1) | Standard NC lacquer | 10 | 10 | 10 |
| (2) | NC/urethane lacquer | 0 | 0 | 2 |
| (3) | NC/urethane lacquer plus cure coat | 10 | 10 | 10 |
| (4) | NC/urethane lacquer plus uncatalyzed cure coat | 2 | 2 | 4 |
| (5) | CAB/urethane lacquer plus cure coat | 10 | 10 | 10 |

EXAMPLE 11

The hardness as a function of time of lacquer films with and without the application of the cure coat composition of Example 1 is compared by means of the Konig hardness test described in Example 5. Glass panels (4×8') are used instead of maple panels. The total dried film thickness on each panel is 3 mils.

A cure coat is applied over the lacquer coating in tests (3) through (5). In test (4) the dimethyltin dichloride catalyst is omitted from the cure coat formulation.

The wiping stain, CSL-202 nitrocellulose/urethane lacquer, CAB/urethane lacquer and standard nitrocellulose lacquer formulations are the same as those used in Example 10.

Each panel is tested after 1, 2, 4, 6 and 24 hours and after 48 hours, 6 days or 7 days. The results of the tests are given in Table 7.

TABLE 7

| | Test Coating | 1 hr. | 2 hrs. | 4 hrs. | 6 hrs. | 24 hrs. | 48 hrs. | 6 days | 7 days |
|---|---|---|---|---|---|---|---|---|---|
| (1) | Standard NC lacquer | 15 | 22 | 31 | 41 | 76 | — | 85 | — |
| (2) | NC/urethane lacquer | 8 | 10 | 11 | 12 | 21 | 47 | — | 119 |
| (3) | NC/urethane lacquer plus cure coat | 42 | 60 | 79 | 88 | 98 | 104 | — | 109 |
| (4) | NC/urethane lacquer plus uncatalyzed cure coat | 5 | 6 | 9 | 10 | 15 | 28 | — | 99 |
| (5) | CAB/urethane lacquer plus cure coat | 30 | 54 | 86 | 98 | 105 | 116 | — | 116 |

What I claim and desire to protect by Letters Patent is:

1. A process for promoting the rapid curing of a coating of a two component polyurethane lacquer that has been applied to a substrate, said process comprising
   (1) coating the polyurethane lacquer while it is in a semi-dry or wet state with a composition consisting essentially of
      a. from about 0.5% to about 20% of a hydroxy functional polymer,
      b. from about 99.4% to about 70% of a solvent for the hydroxy functional polymer, and
      c. from about 0.1% to about 10% of a catalyst for the reaction of hydroxyl groups with isocyanate groups to form urethane linkages, all percentages being by weight based on the total weight of the composition, and
   (2) drying the coated polyurethane lacquer.

2. The process of claim 1 wherein the hydroxy functional polymer is nitrocellulose and the catalyst is an organic tin compound.

3. The process of claim 2 wherein the catalyst is dimethyltin dichloride.

4. The process of claim 2 wherein the catalyst is dibutyltin dilaurate.

* * * * *

UNITED STATES PATENT AND TRADEMARK OFFICE
CERTIFICATE OF CORRECTION

PATENT NO. : 4,891,248          Page 1 of 3

DATED : January 2, 1990

INVENTOR(S) : KRAUS

It is certified that error appears in the above-identified patent and that said Letters Patent is hereby corrected as shown below:

```
Column 4, Line 36,  "   PBW   "  (centered)

should read  --  PBW  -- (above numbers column)

Column 4, Line 56,  "   PBW   "  (centered)

should read  --  PBW  -- (above numbers column)

Column 5, Line 2,   "   PBW   "  (centered)

should read  --  PBW  -- (above numbers column)
```

UNITED STATES PATENT AND TRADEMARK OFFICE
CERTIFICATE OF CORRECTION

PATENT NO. : 4,891,248
DATED : January 2, 1990
INVENTOR(S) : KRAUS

It is certified that error appears in the above-identified patent and that said Letters Patent is hereby corrected as shown below:

Column 6, Line 57, " TABLE 2... "
(entire table was omitted)

should read

-- TABLE 2

| Test Coating | 1 hr. | 2 hrs. | 4 hrs. | 8 hrs. |
|---|---|---|---|---|
| (1) Standard NC lacquer | 6 | 10 | 10 | 10 |
| (2) NC/urethane lacquer | 0 | 0 | 2 | 2 |
| (3) NC/urethane lacquer plus cure coat | 2 | 6 | 10 | 10 |
| (4) NC/urethane lacquer without catalyst, plus cure coat | 4 | 10 | 10 | 10 |
| (5) NC/urethane lacquer, plus uncatalyzed cure coat | 2 | 2 | 2 | 2 |
| (6) CAB/urethane lacquer plus cure coat | 10 | 10 | 10 | 10 |

--

UNITED STATES PATENT AND TRADEMARK OFFICE
CERTIFICATE OF CORRECTION

PATENT NO. : 4,891,248

DATED : January 2, 1990

INVENTOR(S) : KRAUS

It is certified that error appears in the above-identified patent and that said Letters Patent is hereby corrected as shown below:

Column 10, Line 47, " PBW " (centered)

should read -- PBW -- (above numbers column)

Column 11, Line 20, " (4X8') "

should read -- (4x8") --

Signed and Sealed this

Fourth Day of December, 1990

Attest:

HARRY F. MANBECK, JR.

Attesting Officer

Commissioner of Patents and Trademarks